United States Patent [19]
Gordon

[11] Patent Number: 4,854,443
[45] Date of Patent: Aug. 8, 1989

[54] CONVEYOR BELT CLEANER
[75] Inventor: James R. Gordon, Benton, Ill.
[73] Assignee: Gordon Belt Scrapers, Inc., Benton, Ill.
[21] Appl. No.: 269,574
[22] Filed: Nov. 10, 1988
[51] Int. Cl.[4] ............................................. B65G 45/00
[52] U.S. Cl. .................................. 198/497; 198/499; 15/256.5
[58] Field of Search ................ 198/497, 499; 15/256.5
[56] References Cited

U.S. PATENT DOCUMENTS

| | | | |
|---|---|---|---|
| 3,656,610 | 4/1982 | McWilliams | 198/230 |
| 4,489,823 | 12/1984 | Gordon | 198/499 |
| 4,529,084 | 7/1985 | Zhang | 198/499 |
| 4,533,036 | 8/1985 | Gorden | 198/499 |
| 4,633,999 | 1/1987 | Perneczky | 198/499 |
| 4,643,293 | 2/1987 | Swinderman | 198/497 |
| 4,694,952 | 9/1987 | Meijer | 198/499 |
| 4,779,716 | 10/1988 | Gordon | 198/497 |

Primary Examiner—Robert J. Spar
Assistant Examiner—Lyle K. Kimms
Attorney, Agent, or Firm—Kinzer, Plyer, Dorn, McE-chran & Jambor

[57] ABSTRACT

A conveyor belt cleaner including an elongated support member extending across but spaced from the conveyor belt comprises a mounting plate including a plurality of anchor apertures at spaced intervals along its length and a corresponding plurality of molded, resilient resin cleaner blade support arms each slotted to receive the mounting plate and each secured on the mounting plate by an anchor lug engaged in an interference fit in one of the anchor apertures. A corresponding plurality of molded, resilient resin cleaner blade units are mounted on the outer ends of the blade support arms; each blade unit has a keyed, slotted interference fit with its support arm. C-shaped metal reinforcements molded into both ends of the blade support arms reinforce the slot mountings.

7 Claims, 2 Drawing Sheets

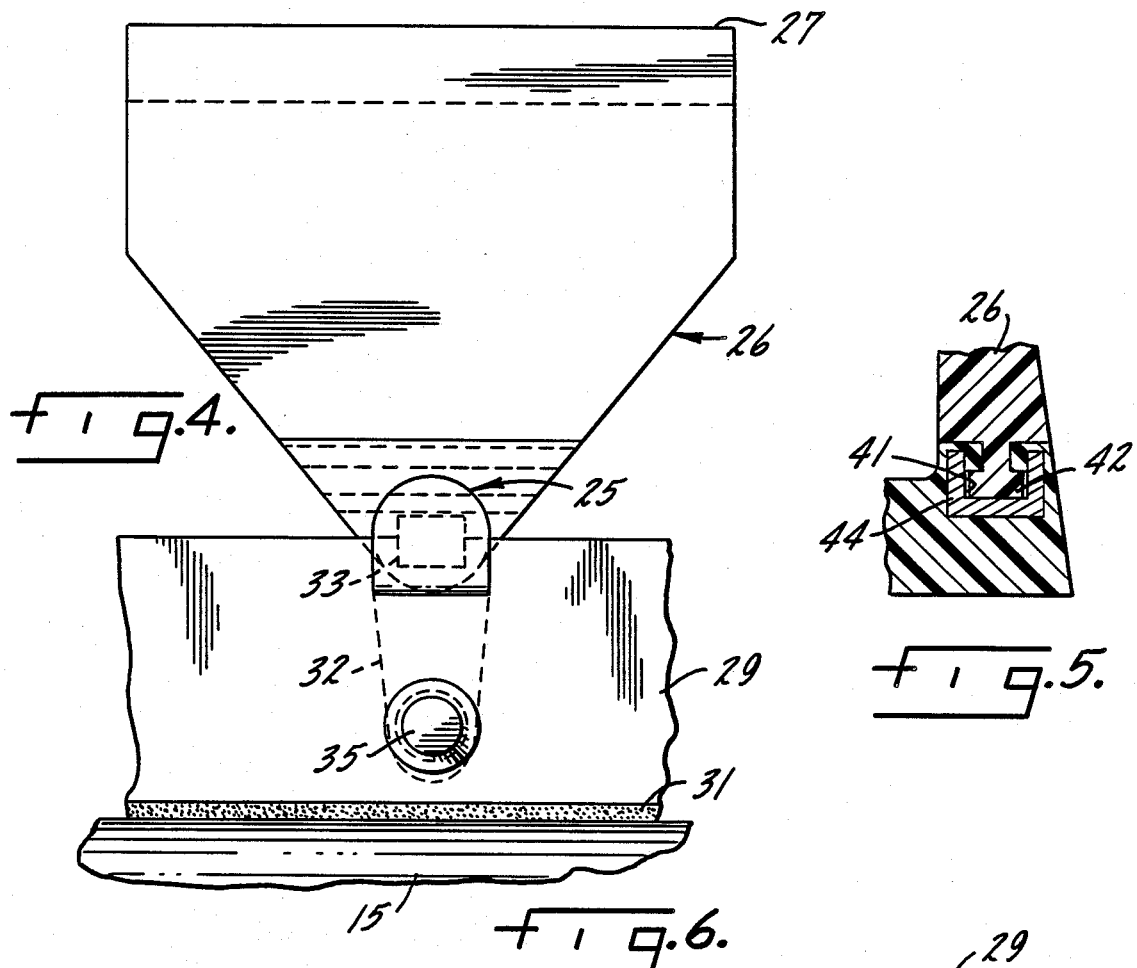
fig.4.
fig.5.
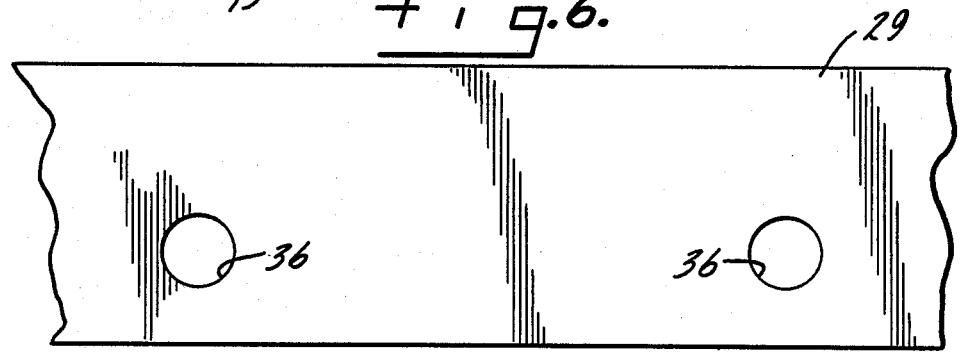
fig.6.
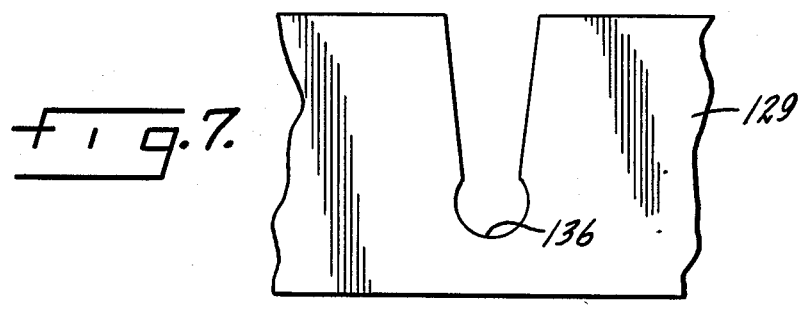
fig.7.

CONVEYOR BELT CLEANER

BACKGROUND OF THE INVENTION

Blade type cleaners are frequently used with belt conveyors in mining and mineral storage operations and other such applications; the cleaner clears the conveyor belt of material that would otherwise adhere to its surface. These conveyor belt cleaners usually operate in an environment that can only be described as hostile. The working conditions are frequently wet, dirty, and even corrosive. Continuing maintenance activity is a necessity due to inevitable wear on the cleaner blades, but is often rendered difficult by limited access space and the aforementioned adverse working conditions. In excessively wet or corrosive environments, maintenance is made more difficult by corrosion of metal mounting bolts, clamps, and the like. All of these difficulties are likely to be present in mining operations and also in industrial applications.

A conveyor cleaner is also likely to encounter substantial problems from shock forces applies to the cleaner blades. Large pieces of the conveyed material or debris adherring to the conveyor belt, when engaged by a cleaner blade, may damage the blade or its support. The cleaner blades are also subject to impact by engagement with the joints between individual segments of the conveyor belt. Repeated shocks and impacts of this kind may lead to shutdown for repair or replacement of cleaner components, a time consuming and expensive procedure. Thus, it is important to minimize or avoid shock damage to the components of the conveyor belt cleaner as well as to compensate for the inevitable wear on cleaner blades due to continuing normal operation.

A highly effective and efficient conveyor belt cleaner utilizing a torsion bias mechanism to maintain the cleaner blades in engagement with the conveyor belt is disclosed in U.S. Pat. No. 4,533,036 issued to James R. Gordon Aug. 6, 1985. Even that conveyor cleaner, however, has the disadvantage that replacement of the cleaner blade supports may require appreciable downtime because the blade supports are all keyed to the torsion biased shaft. Some of the blade support arms utilized in that system also have the disadvantage of being formed of metal, which may be undesirable in some excessively wet and corrosive environments. Thus, despite the generally excellent performance characteristics of that conveyor belt cleaner, some difficulties remain.

An improved blade support arm construction and mounting arrangement for the blade support arms of a conveyor belt cleaner, particularly the cleaner of Gordon U.S. Pat. No. 4,533,036, is disclosed in U.S. application Ser. No. 899,417, filed Aug 22, 1986, now U.S. Pat. No. 4,779,716. That belt cleaner support arm and mount allows rapid and convenient replacement of individual cleaner blades and affords effective shock protection for the cleaner and the conveyor belt in most applications. But the individual pin-type support arm anchors used in that system are undesirably expensive for at least some applications. Moreover, the interconnections between the blades and their support arms, and between the support arms and their base, do not always afford the desired durability when employed in severe adverse conditions.

SUMMARY OF THE INVENTION

It is an object of the present invention, therefore, to provide a new and improved conveyor belt cleaner, suitable for use in mining and in heavy duty industrial applications, that provides for rapid and convenient replacement of blades and individual cleaner blade support arms, and that affords improved shock protection for the cleaner blades, support arms, and conveyor belt, in a construction that is simple, inexpensive, and highly durable.

Accordingly, the present invention relates to an improved blade and support arm construction for a conveyor belt cleaner of the kind comprising an elongated mounting plate of given thickness extending in transverse spaced relation to a conveyor belt and having a plurality of anchor apertures therethrough at regularly spaced positions along the mounting plate length, a plurality of elongated blade support arms each of molded, resilient resin, each support arm having an anchor end for mounting the arm on the mounting plate, and a blade end for supporting a cleaner blade, and a plurality of cleaner blades, each mounted on the blade end of a support arm and extending therefrom into engagement with the conveyor belt. The improvement of the invention comprises the mounting end of each blade support arm having a first transverse slot, complementary to the configuration of one edge of the mounting plate and fitting closely over the one edge of the mounting plate, an elongated leg extending from the support arm as an extension of one side of the first transverse slot, and an anchor lug projecting from the leg a distance equal to the plate thickness, through one of the anchor apertures in the mounting plate. The blade end of the support arm has a second transverse slot, and each cleaner blade includes an elongated key element fitting into the second transverse slot of the support arm in a keyed interference fit to afford a firm but displaceable mounting of the blade on the blade end of the support arm in a predetermined fixed orientation relative to the blade support arm. A metal reinforcement, preferably of substantially C-shaped cross-sectional configuration, is molded into one end of each support arm, extending along and reinforcing one of the transverse slots.

BRIEF DESCRIPTION OF THE DRAWINGS

FIG. 4 is an end elevation view taken approximately as indicated by line 4—4 in FIG. 2;

FIG. 5 is a detail sectional view of the interconnection between the support arm and the cleaner blade; and FIGS. 6 and 7 are detail views of short sections of support members usable in the belt cleaner of FIGS. 1–5.

DESCRIPTION OF THE PREFERRED EMBODIMENTS

Figure 1:
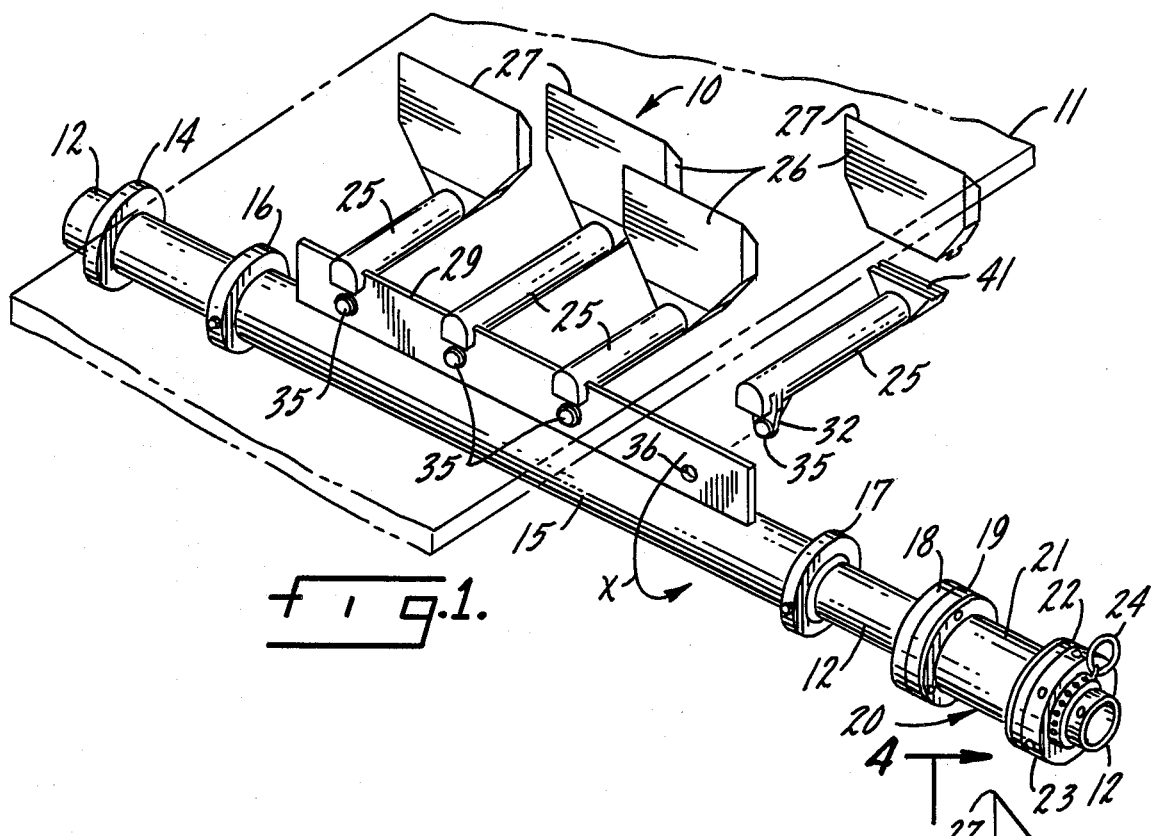
FIG. 1 is a simplified perspective view of a conveyor belt cleaner constructed in accordance with a preferred embodiment of the present invention.

FIG. 1 illustrates a conveyor belt cleaner 10 of the kind disclosed in greater detail in the aforementioned U.S. Pat. Nos. 4,533,036 and 4,779,716, to Gordon modified to incorporate the improved blade mount construction of the present invention. Belt cleaner 10, shown associated with a moving conveyor belt 11, comprises an elongated shaft 12 that extends transversely of belt 11 in spaced relation to the surface of the belt. The left-hand end of shaft 12, as shown in FIG. 1, is journalled in a bearing 14 supported by a fixed frame (not shown). Inwardly from bearing 14, shaft 12 is affixed to an elongated sleeve or mounting member 15 by suitable means such as a mounting collar 16. A similar mounting collar 17 joins the other end of the tubular mounting member 15 to shaft 12. Shaft 12 may be formed in segments or may be continuous through the interior of sleeve 15.

The right-hand portion of shaft 12, FIG. 1, extends through another bearing 18 mounted on the fixed frame (not shown) that affords general support for conveyor cleaner 10. Bearing 18 is connected to a flange 19 on a torsion tube 21 that is part of a torsion bias mechanism 20. Another flange 22 on the outer end of torsion tube 21 is connected to a collar 23. Collar 23 is connectible to the outer end of shaft 12 through an angularly adjustable connection comprising a shear pin 24.

Conveyor belt cleaner 10 further comprises a plurality of resilient blade support arms 25. The blade support arms 25 are mounted at spaced longitudinal positions along the mounting member, sleeve 15, and all project from the mounting member, generally toward conveyor belt 11, in a predetermined fixed orientation. A corresponding plurality of cleaner blades 26 are included in belt cleaner 10, each blade 26 being mounted on the outer end of one of the blade support arms 25. Support arms 25 are all essentially identical in construction except that two different lengths may be employed, alternately, so that the cleaner blades 26 are disposed in slightly overlapping alignment across the width of conveyor belt 11 to assure thorough cleaning of all of the belt surface.

As thus far described, conveyor belt cleaner 10 corresponds essentially to the constructions disclosed in the aforementioned U.S. Pat. Nos. 4,533,036 and 4,779,716 to Gordon. In operation, the torsion bias mechanism 20 biases shaft 12 and support sleeve 15 toward rotation in the direction indicated by arrow X. As a consequence, the cleaning edges 27 of blades 26 are maintained in engagement with the bottom surface of conveyor belt 11, cleaning adherent material and debris from the belt surface. Major shocks are taken up, to a substantial extent, by the torsion bias mechanism 20. Of course, the continuing bias afforded by mechanism 20 effectively compensates for gradual wear on the belt-engaging surfaces 27 of cleaner blades 26. The improvement represented by the present invention pertains to blade support arms 25, the mounting of blades 26 on those support arms, and the mounting of blade support arms 25 on the transverse mounting member 15.

FIGS. 2-5 illustrate one of the blades 26, its support arm 25, and the manner in which arm 25 is mounted upon member 15. The blade support arm 25 is of unitary molded resilient resin construction. The preferred material for arm 25 is a relatively dense and heavy polyurethane. The inner or anchor end of blade support arm 25, the end adjacent shaft 15, includes a transverse open slot 28 that fits tightly over a relatively rigid metal mounting plate 29 that is firmly affixed to mounting shaft 15 as by welds 31, thus forming an integral part of member 15. One surface of slot 28 is extended as an anchor leg 32, molded integrally with support arm 25; leg 32 should be in surface-to-surface contact with mounting plate 29 throughout most or preferably all of the leg length.

Figure 3:
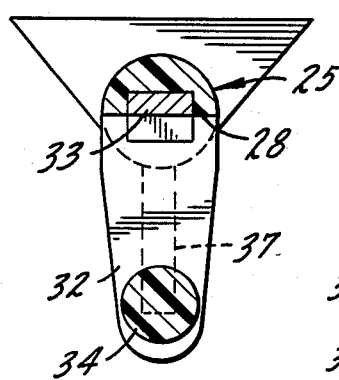
FIG. 3 is a detail sectional view taken approximately along line 3—3 in FIG. 2.
Figure 2:
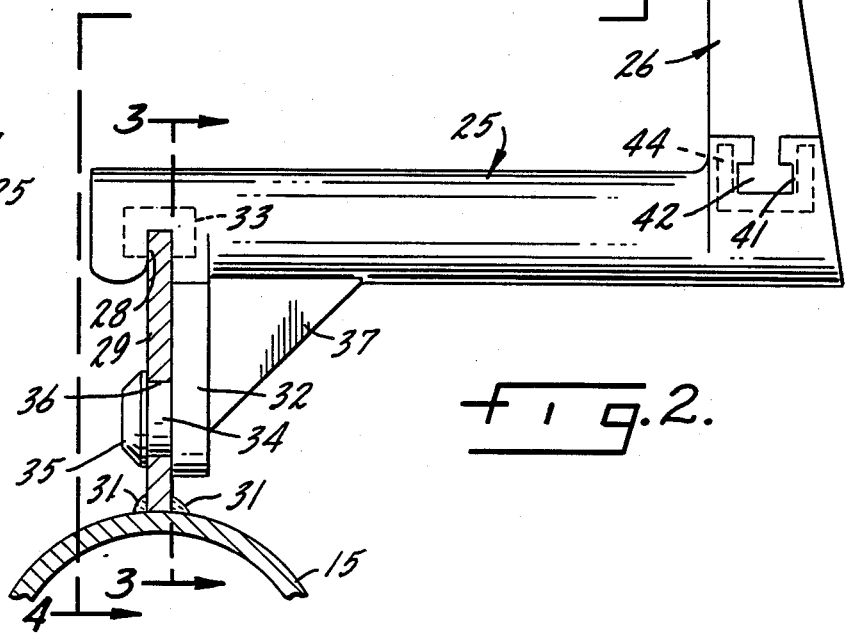
FIG. 2 is a side elevation view of one cleaner blade, and its support arm, from the conveyor cleaner of FIG. 1.

Above slot 28, a C-shaped metal reinforcement 33 is integrally molded into support arm 25; see FIGS. 2 and 3. Reinforcement 33 engages the top and both sides of mounting plate 29. A thin film of the resin of arm 25 may cover reinforcement 33 to protect it against corrosion, but this is not essential. The metal reinforcement stiffens and strengthens the anchor connection between arm 25 and mounting plate 29, protecting that connection against damage from forces tending to bend, twist, compress and stretch arm 25.

A short anchor lug 34 is molded as an integral part of leg 32, projecting outwardly of the leg through an anchor aperture 36 in mounting plate 29 (FIGS. 2 and 3). The end of lug 34 opposite leg 32 is somewhat enlarged, affording a head 35 of tapered or frusto-conical configuration that can be forced through aperture 36 without undue difficulty, from right to left as seen in FIG. 2. But the tapered shape of the anchor lug head 35 is such that it is considerably more difficult to drive it back left to right through hole 36 in plate 29. Thus, anchor lug 34 and its head 35, in conjunction with leg 32 and slot 28, provide strong, positive retention of support arm 25 on mounting plate 29, and hence on member 15, once the support arm is installed in its operating position (FIGS. 1 and 2). Further reinforcement for the mounting of arm 25 on plate 29 may be provided by a brace 37 for leg 32, molded integrally into arm 25.

The blade end of support arm 25, the right hand end as seen in FIG. 2, includes a second transverse slot 41 of inverted T-shaped configuration. An elongated key element 42 of complementary configuration fits into slot 41 in a keyed interference fit, as shown in FIGS. 2 and 5. This connection affords a firm but displaceable mounting of blade 26 on the blade end of support arm 25, with blade 26 in a predetermined fixed orientation relative to its support arm.

The blade end of each support arm 25, like the anchor end, is metal reinforced. Thus, a substantially C-shaped metal reinforcement 44, preferably steel, is molded into the blade end of arm 25, spanning and embracing the transverse slot 41 that receives the blade key 42. The "wear" parts in belt cleaner 10 are its blades 26; reinforcement 44 provides much longer life for the mounting keyway in which a succession of such blades are mounted. The two reinforcements 33 and 44, at the opposite ends of arm 25, materially increase the life of support arm 25, protecting the critical mounting portions of the arm against damage under virtually all operating conditions, however adverse. Of course, a film of resin may cover the inner channel surfaces of reinforcement 44, just as in the case of reinforcement 33.

As shown in FIG. 6, mounting plate 29 is preferably a simple, inexpensive steel plate with a series of ordinary apertures 36 drilled through the plate to serve as anchor apertures for the support arm anchor lugs 34,35. A slightly more expensive plate construction 129, with slotted anchor apertures 136, shown in FIG. 7, can be used; it is a commercially available construction and is also shown in Swinderman U.S. Pat. Nos. 4,598,823 and 4,643,293. The simple drilled apertures of FIG. 6 are preferred because they afford better anchorage for the blade support arms, but the invention does perform satisfactorily with the mounting plate of FIG. 7.

Blades 26 are usually of molded resin; again, a relatively dense polyurethane is suitable. However, metal, ceramic, or combination resin and ceramic blades may be utilized if desired.

The metal reinforcements 33 and 44 afford a much longer operating life for each blade support arm 25 than might otherwise be realized. Located at the points of primary stress for arm 25, they allow the arm to remain in service long after it might well be worn out or damaged due to the many stresses and shocks to which each blade support arm is frequently subject while in use. The simple reinforced slot mount 41,42, at the blade end of each arm 25, joining the arm to its blade 26, also adds to durability of the support arm as compared with other mounting arrangements. At the end of each arm mounted on plate 29, the combined effect of the reinforced slot 28 fitting closely over plate 29, plus leg 32 and lug 34, with the lug head 35 snap-fit through plate aperture 36, affords an arm mount substantially more durable than prior constructions. Nevertheless, both the blades and their support arms are readily and rapidly replaceable, with no tools required except, perhaps, a hammer or mallet.

I claim:

1. An improved blade and support arm construction for a conveyor belt cleaner of the kind comprising:
   an elongated mounting plate of given thickness extending in transverse spaced relation to a conveyor belt and having a plurality of anchor apertures therethrough at regularly spaced positions along the mounting plate length,
   a plurality of elongated blade support arms each of molded, resilient resin, each support arm having an anchor end for mounting the arm on the mounting plate, and a blade end for supporting a cleaner blade,
   and a plurality of cleaner blades, each mounted on the blade end of a support arm and extending therefrom into engagement with the conveyor belt;
   the improvement comprising:
   the mounting end of each blade support arm having a first transverse slot, complementary to the configuration of one edge of the mounting plate and fitting closely over the one edge of the mounting plate, an elongated leg extending from the support arm as an extension of one side of the first transverse slot, and an anchor lug projecting from a free end of the leg a distance at least equal to the plate thickness, through one of the anchor apertures in the mounting plate;
   the blade end of the support arm having a second transverse slot;
   each cleaner blade including an elongated key element fitting into the second transverse slot of the support arm in a keyed interference fit to afford a firm but displaceable mounting of the blade on the blade end of the support arm in a predetermined fixed orientation relative to the blade support arm;
   and a metal reinforcement molded into one end of each support arm, extending along and reinforcing one of the transverse slots.

2. An improved conveyor belt cleaner blade and support arm construction, according to claim 1, in which there are two C-shaped metal reinforcements, one molded into each end of the support arm, each reinforcement extending along and around one of the transverse slots.

3. An improved conveyor belt cleaner blade and support arm construction, according to claim 1 in which the anchor lug has a tapered head with a maximum diameter larger than the anchor aperture, so that the lug is readily insertible through the anchor aperture but difficult to withdraw therefrom.

4. An improved conveyor belt cleaner blade and support arm construction, according to claim 3, in which there are two C-shaped metal reinforcements, one molded into each end of the support arm, each reinforcement extending along and around one of the transverse slots.

5. An improved conveyor belt cleaner blade and support arm construction, according to claim 3, in which the elongated leg of each blade support arm engages in surface-to-surface contact with the mounting plate.

6. An improved conveyor belt cleaner blade and support arm construction, according to claim 5, and further comprising a brace, molded integrally with each blade support arm, stiffening and reinforcing the elongated leg.

7. An improved conveyor belt cleaner blade and support arm construction, according to claim 6, in which there are two C-shaped metal reinforcements, one molded into each end of the support arm, each reinforcement extending along and around one of the transverse slots.

* * * * *